E. NORZI.
MANUFACTURE OF ARTICLES OF HORNY MATERIAL.
APPLICATION FILED MAR. 30, 1921.

1,421,095.  Patented June 27, 1922.

Inventor:
Ercole Norzi
By Laurence Langner
Attorney

UNITED STATES PATENT OFFICE.

ERCOLE NORZI, OF TURIN, ITALY, ASSIGNOR TO SOCIETÁ ANONIMA "ACLASTITE," OF VERCELLI, ITALY, A COMPANY OF ITALY.

MANUFACTURE OF ARTICLES OF HORNY MATERIAL.

1,421,095.  Specification of Letters Patent.  Patented June 27, 1922.

Application filed March 30, 1921. Serial No. 456,976.

(GRANTED UNDER THE PROVISIONS OF THE ACT OF MARCH 3, 1921, 41 STAT. L., 1313.)

*To all whom it may concern:*

Be it known that I, ERCOLE NORZI, a subject of the King of Italy, and resident of Turin, Italy, have invented certain new and useful Improvements in the Manufacture of Articles of Horny Material (for which applications were filed in Italy Sept. 23, 1916; in Great Britain Oct. 31, 1918, No. 129,894; in France Nov. 6, 1918, No. 492,755; in Switzerland Dec. 13, 1920; in Austria Dec. 20, 1920, and in Hungary Dec. 27, 1920), of which the following is a specification.

In the manufacture of articles made of horn and the like by compression under heat, very great difficulties are experienced when it is desired to produce economically articles having a certain thickness.

These difficulties are due to the fact that the greater portion of the rough material found on the market is in the form of relatively thin plates such as claws, horns, etc. and that this material although plastic under the action of heat has no tendency to weld together even under high pressure.

Consequently in order to avoid the necessity of employing a material of considerable thickness, which is very expensive, the method has been adopted of clamping together several layers of thin material by means of metal fittings or fastenings, or of forming the plates of such material in such a manner as to cause them to engage with one another by the action of the pressure in the final stamping.

Further, with the methods at present in use, the articles produced thereby have on their surface fins which must be removed from the finished article, with the result of impairing the appearance and commercial value of the articles, more particularly on account of the location where the said fins necessarily occur.

The present invention has for its object an apparatus for the treatment of horn and the like which allows of producing from relatively thin pieces of that material, such as can be acquired at advantageous terms in commerce, articles of considerable thickness owing to the peculiar shape of the dies wherein the material is shaped to form the said articles.

By the apparatus according to this invention the fin which is an unavoidable consequence of the stamping operation, is located on a part of the article such that the said fin can be removed without impairing the appearance of the article which acquires thereby a higher commercial value.

In the accompanying drawings:—

Figure 1:
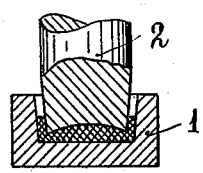
Figure 1 is a section of a matrix and a patrix as employed at present for stamping small articles of horn for the purpose of showing the location of the fin.
Figure 2:
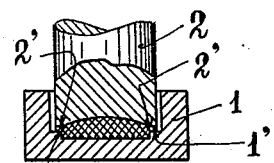
Figure 2 shows the corresponding matrix and stamp constructed according to the present invention.

As shown in Figure 1, the matrix 1 and the patrix 2 as hitherto constructed have the actual contour of the finished article so that the stamping has the effect of causing the compressed material to squeeze out between these two parts and thus produce a fin that extends over the surface of the finished article in such a manner as to impair the appearance of the latter when the fin is removed.

According to the present invention the corresponding recesses of the matrix 1 and the patrix 2, in which the horny material is compressed, are surrounded by cooperating surfaces 1'—2', that correspond to each other in such a manner that at the commencement of the compression the compressed material enters between these said surfaces and, being rendered plastic by heat, is forced towards the central portion of the recess in which the article is being shaped.

The result of this arrangement is that the fin is formed at the periphery of the article, so that the appearance of the latter is not impaired by the removal of the fin.

Figure 3:
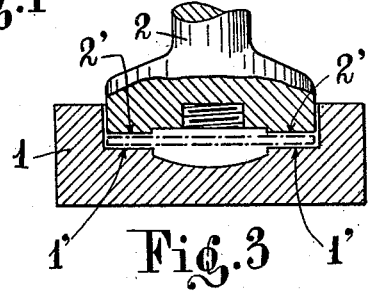
Figure 3 shows a matrix and a patrix according to this invention for stamping articles of considerable thickness from thin plates.

Figure 3 shows a type of matrix and patrix according to the present invention which may be employed for producing articles of a thickness considerably greater than the thickness of the original material, for instance a cap with a screwed stem. In such a case the matrix 1 has a recess corresponding to the head of the cap whilst the patrix has a recess corresponding to the stem provided internally with a negative or counterpart of the screwthread that is to be formed on the stem.

The two cavities are surrounded by cooperating surfaces 1', 2' such that the material (which is indicated in dot and dash lines and has a greater width but less thickness than the finished article) is crushed between the said surfaces at the beginning of the compression and is forced into the central recess of the matrix until it completely fills and acquires the shape of the latter.

After the stamping operation is completed, the finished article which has acquired the shape of the screwthread of the patrix 2 is unscrewed from the latter and the fin is then removed; the position of the fin being such as not to impair the appearance of the article.

Figure 4:
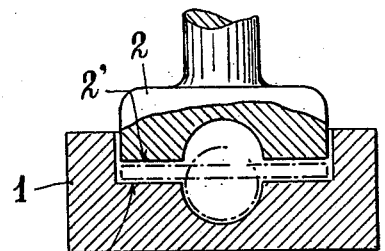
Figures 4 and 5 are sections at right angles to each other of the matrix and stamp according to the present invention for forming a cylindrical article from a plate of horn.
Figure 5:
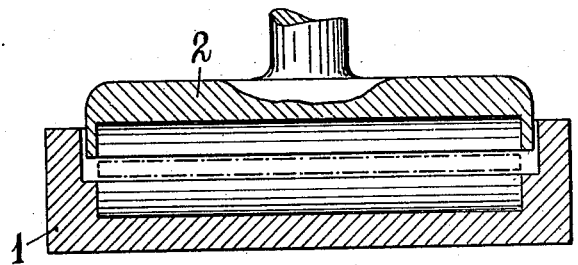

Figures 4 and 5 show an apparatus for producing a cylindrical article (indicated by dotted lines) from a thin plate (indicated in dot and dash lines).

In this case also the corresponding recesses in the matrix 1 and patrix 2 are surrounded by surfaces 1'—2' of suitable dimensions between which the rough material is placed and forced into the internal cavity by the stamping pressure.

It is to be understood that the types of matrices shown on the drawings are given solely by way of example, since they may be adapted in each particular case to the shape of the article which it is desired to produce the essential feature of the invention consisting in this that the recesses corresponding to the shape of the finished article shall be surrounded by surfaces between which the plate of material (which has become plastic by the application of heat), is forced into the central cavity which it fills up completely and of which it acquires the shape.

It is to be understood that the several operations and manipulations of the material are made in the well known or suitable manner according to the practice of the manufacture of articles from horny material, heat being applied to said matrix and patrix or to either of them or also to the material, before and during the compression or only before or during this compression, as preferred. Further the means for said application of heat may be of any suitable or desired kind.

What I claim as my invention and desire to secure by United States Letters Patent is:—

1. In the manufacture of articles of horny material by compression under heat, an apparatus comprising a matrix and a patrix adapted to be forced against each other, said matrix and patrix having cooperating means for shaping therebetween a piece of material, which means comprise a recess, and cooperating surfaces which surround said recess, said surfaces providing a room for a piece of material having larger area and reduced thickness than the article to be obtained, and the material enclosed between said surfaces being forced into said recess when said members are forced towards each other.

2. In the manufacture of articles of horny material by compression under heat, an apparatus comprising a matrix and a patrix adapted to be forced against each other, said members having cooperating means for shaping therebetween a piece of material, which means comprise a recess, and cooperating surfaces which surround said recess, said surfaces being positioned to come together at the time of the compression before the surfaces of said shaping means, said surfaces providing a room for a piece of material having larger area and reduced thickness than the article to be obtained and the material enclosed between said surfaces being forced into said recess when said members are forced towards each other.

3. In the manufacture of articles of horny material by compression under heat, an apparatus comprising a matrix and a patrix adapted to be forced against each other said members having cooperating recesses for shaping a piece of material and cooperating surfaces which surround the mouths of said recesses, said surfaces providing a room for a piece of material having larger area and reduced thickness than the article to be obtained and the material enclosed between said surfaces being forced into said recesses when said parts are forced towards each other.

4. In the manufacture of articles of horny material by compression under heat, an apparatus comprising a matrix and a patrix adapted to be forced against each other, one of said members providing a recess for shaping a piece of material and a surface surrounding the mouth of said recess, a surface on the other member adapted to come in front to said first-named surface, said surfaces cooperating to provide a room for a piece of material having larger area and reduced thickness than the article to be obtained and to force the material enclosed between them into said recess when said members are forced against each other.

Signed at Turin, Italy, this 10th day of March, 1921.

ERCOLE NORZI.